United States Patent [19]
Beck et al.

[11] 3,763,418
[45] Oct. 2, 1973

[54] SINGLE REACTOR FORCE COMMUTATED CHOPPER

[75] Inventors: William H. Beck; Gilbert I. Cardwell, Jr., both of Palos Verdes Peninsula, Calif.

[73] Assignee: The Garrett Corporation, Los Angeles, Calif.

[22] Filed: Apr. 24, 1972

[21] Appl. No.: 246,846

[52] U.S. Cl. ............................................. 321/45 C
[51] Int. Cl. .......................................... H02m 7/52
[58] Field of Search ...................... 321/43, 44, 45 C; 323/DIG. 1

[56] References Cited
UNITED STATES PATENTS

| | | | |
|---|---|---|---|
| 3,594,629 | 7/1971 | Kawakami et al. | 321/45 C |
| 3,600,666 | 8/1971 | Gliever | 323/DIG. 1 |
| 3,538,419 | 11/1970 | Nagataka Seki et al. | 321/45 C |
| 3,530,503 | 9/1970 | Appelo et al. | 321/45 C |
| 3,648,151 | 3/1972 | Gurwicz | 321/45 C X |
| 3,648,437 | 3/1972 | Bridges | 323/24 |
| 3,614,586 | 10/1971 | King | 321/45 C X |

*Primary Examiner*—William M. Shoop, Jr.
*Attorney*—Robert H. Fraser et al.

[57] ABSTRACT

A force commutated thyristor chopper is disclosed in which a single commutation inductor is coupled in the free-wheeling path of the chopper together with a free-wheeling diode. The single inductor provides a chopper of relatively simple configuration in which main and commutator thyristors couple a commutation capacitor to opposite ends of the commutation inductor, and a charging diode is coupled in parallel with the commutator thyristor to facilitate charging of the commutation capacitor in opposite senses. The resulting circuit arrangement operates in a highly effective and efficient manner, minimizes trapped energy and protects the various component parts thereof by preventing dangerously high current and voltage transients.

10 Claims, 13 Drawing Figures

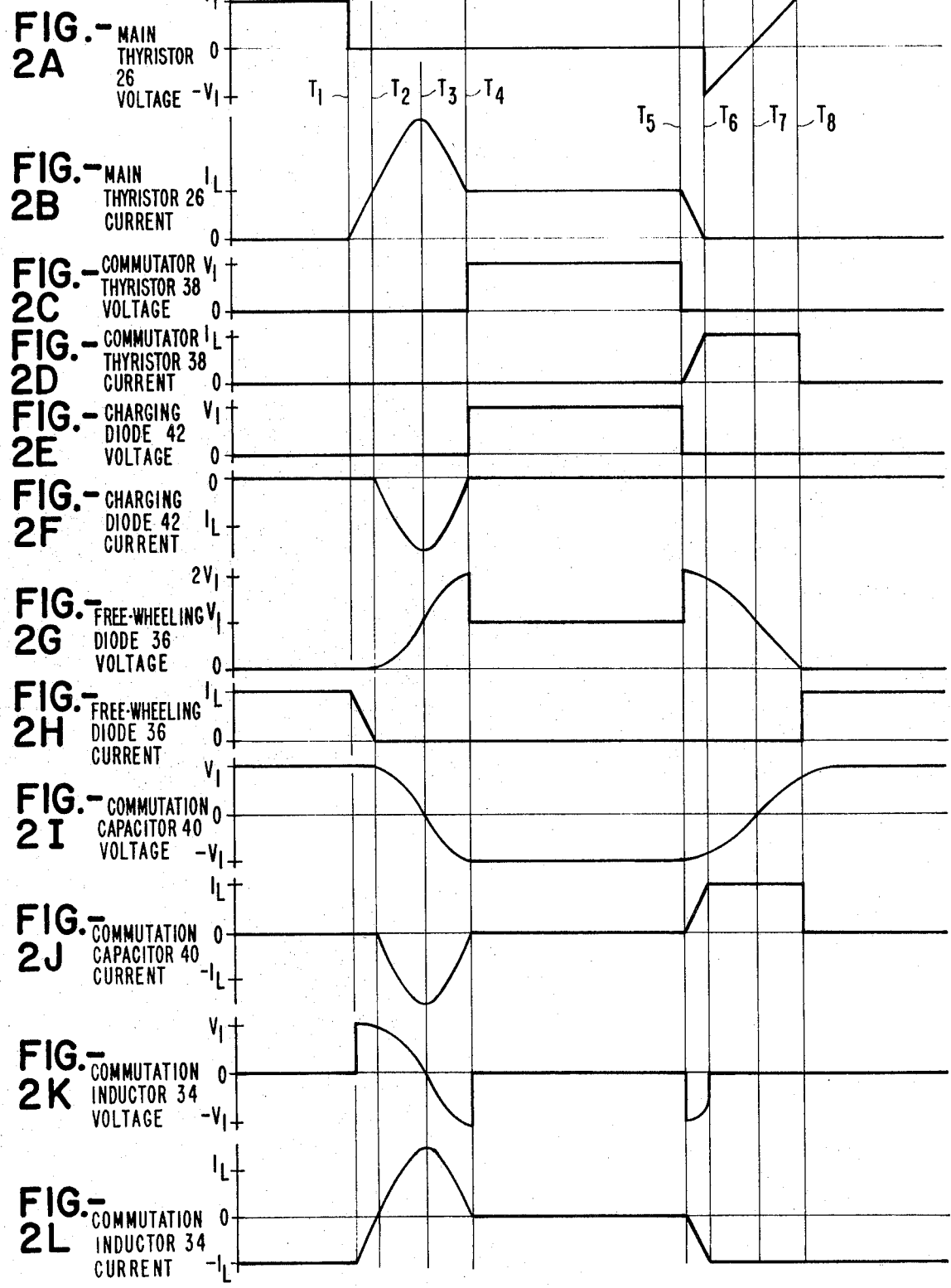

SINGLE REACTOR FORCE COMMUTATED CHOPPER

BACKGROUND OF THE INVENTION

1. Field of the Invention

The present invention relates to circuits for operating upon DC signals so as to change the voltage or other parameters thereof, and more particularly to time ratio controllers or choppers of the type in which thyristors or similar solid state unilateral gating devices are force commutated using inductive and capacitive components.

2. History of the Prior Art

There is frequently a need for devices which can be used to control selected parameters of a DC signal such as the voltage thereof. For example, in the case of a DC motor it may be desirable to provide a device or devices for selectively lowering the voltage of a DC signal as applied to the DC motor from a fixed voltage source to effect speed variations of the motor. While the voltage regulator represents one common device used for such applications, such devices have inherent limitations which may render them unsuitable. For example, the resistors typically employed in voltage regulators so as to dissipate energy as the voltage is stepped down may create an intolerable heating problem. Then too the jerkiness upon acceleration and deceleration of motors using such devices may prove to be highly disadvantageous.

An alternative approach to the problem of regulating a DC voltage is to use a time ratio controller (TRC) or chopper which effectively acts as a switch coupled to a DC source so as to periodically apply the DC source in the form of a series of pulses to an output. An inductive filter used to couple the load to the output terminals effectively filters the pulses to provide a DC voltage of desired value to the load. The pulses at the output may be generated using two or more controllably conductive devices such as thyristors. Alternate conduction or commutation of the thyristors may be accomplished using a number of different techniques, one of the most common of which involves the use of inductive and capacitive elements to force-commutate the thyristors.

Time ratio controllers or choppers of the type described often comprise a highly effective means of regulating the voltage or other parameters of a DC signal without the disadvantages usually present in equivalent devices such as step-like variations in the voltage and the dissipation of substantial amounts of energy. By the same token, however, many conventional chopper circuits may prove to be impractical for a number of reasons. For one thing conventional chopper circuits often require components such as commutation capacitors and thyristors which have relatively high ratings, far in excess of the DC source voltage, for example. Such highly rated components are often necessary in order to accommodate large amounts of trapped energy as well as large current and voltage transients. One problem which is common to such circuits is a high initial rate of current rise in the thyristors. A similar problem is frequent or occasional overcharging of the commutation capacitor or capacitors depending upon the magnitude of the current through the load. Internal transients can typically be controlled, but only at the expense of greater circuit complexity such as by incorporating suppression networks. Wide range control of the chopper frequently requires a chopper of relatively complex configuration or one requiring extensive circuitry for carrying out complex gating logic. In those choppers of the type which couple diodes in parallel with the thyristors, the reverse bias which can be applied to the thyristors is necessarily limited and commutation is therefore less reliable than is often desired. Accordingly it is an object of the invention to provide an improved time ratio controller or chopper.

A further object of the invention is the provision of a force commutated chopper in which trapped energy and undesirably large current and voltage transients are minimized or eliminated.

A still further object of the invention is the provision of a force commutated chopper which operates in a positive and reliable manner and which is of relatively simple configuration.

BRIEF SUMMARY OF THE INVENTION

The present invention provides a force commutated chopper which utilizes a single commutation inductor. The single commutation inductor is coupled in the free-wheeling path of the chopper circuit so as to cooperate with a commutation capacitor and a pair of diodes in commutating a pair of thyristors without undesirable transient overloads or large amounts of trapped energy. The resulting chopper circuit is relatively simple as well as reliable and maintains high efficiency and wide range capability.

In one preferred embodiment of a chopper circuit in accordance with the invention the single commutation inductor and a free-wheeling diode are coupled in parallel with the load to define a free-wheeling path for trapped energy caused by an inductive filter in series with the load. A commutation capacitor is coupled to the opposite side of a main thyristor from the commutation inductor, with the opposite side of the commutation capacitor being coupled to the other side of the commutation inductor via the parallel combination of a charging diode and a commutator thyristor. The single commutation inductor limits the current rise in the main and commutator thyristors to safe levels and prevents overcharge of the commutation capacitor. The various components such as the commutation capacitor and the commutation inductor may have relatively small values, and the resulting arrangement provides high reverse commutation bias of the main thyristor, a low reapplied voltage increase to the main thyristor and clearing of the various devices including the free-wheeling diode effectively and without damaging transients.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIGS. 2A–2L are voltage and current waveforms useful in describing the operation of the arrangement of FIG. 1.

DETAILED DESCRIPTION

Figure 1:
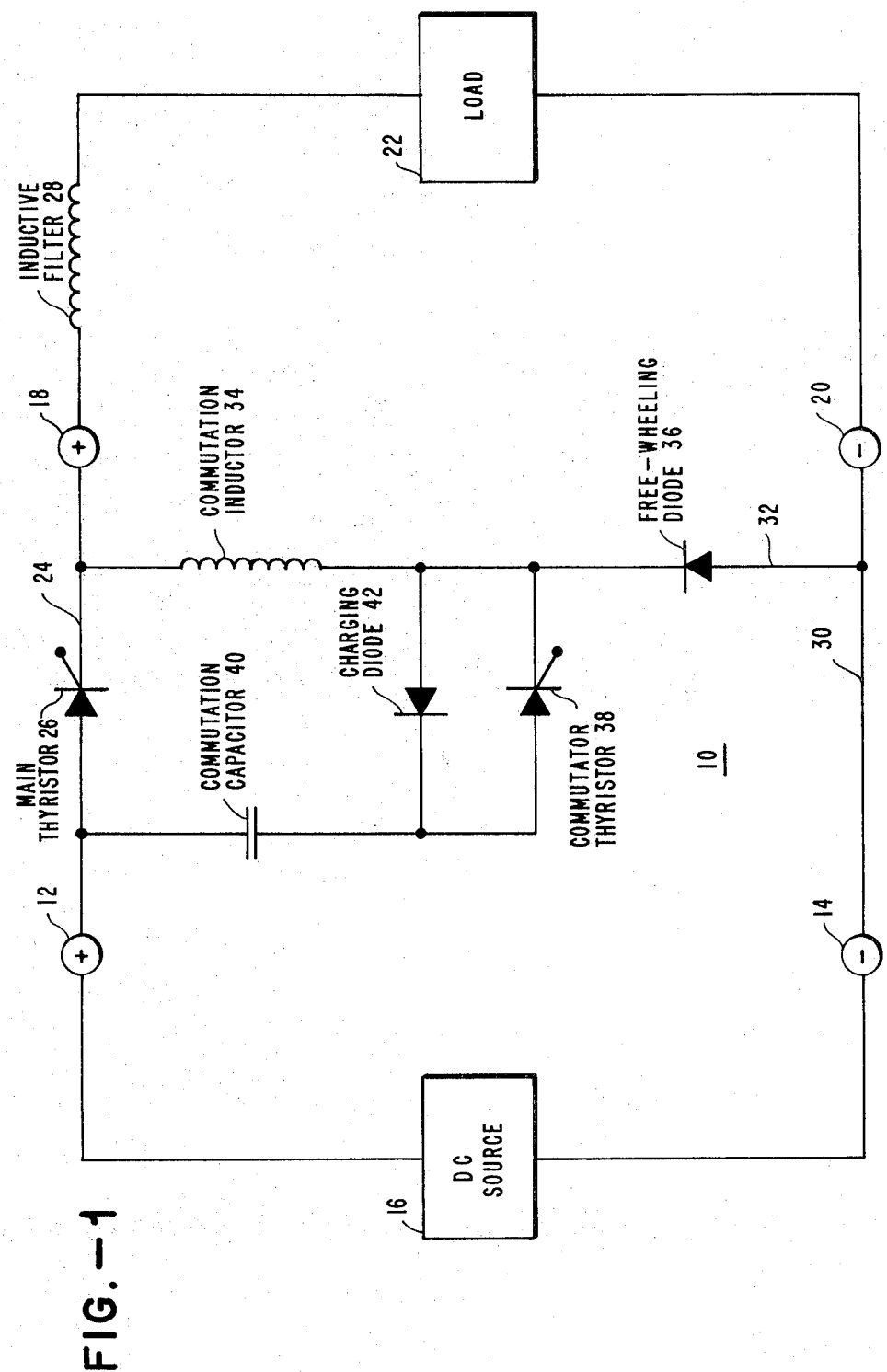
FIG. 1 is a schematic diagram of a preferred arrangement of a force commutated chopper in accordance with the invention.

FIG. 1 comprises a schematic diagram of one preferred arrangement of a force commutated thyristor chopper 10 in accordance with the invention. The chopper 10 includes positive and negative input terminals 12 and 14 coupled across a low impedance DC source 16 and positive and negative output terminals 18 and 20 coupled across a load 22. The positive input terminal 12 is coupled to the positive output terminal 18 via a lead 24 which includes a main silicon-controlled rectifier or thyristor 26. An inductive filter 28 is coupled between the positive output terminal 18 and the load 22. The main thyristor 26 is poled to pass current in a direction from the input terminal 12 to the output terminal 18 when conductive.

The negative input terminal 14 is coupled to the negative output terminal 20 via a lead 30. The lead 30 is also coupled to the lead 24 by a free-wheeling lead or path 32 which includes a commutation inductor 34 adjacent the lead 24 and a free-wheeling diode 36 adjacent the lead 30. The free-wheeling diode 36 is poled to pass free-wheeling current in a direction from the lead 30 to the lead 24. The commutation inductor 34 has an inductance less than that of the inductive filter 28.

A commutator silicon-controlled rectifier or thyristor 38 has one end thereof coupled to the opposite end of the commutation inductor 34 from the main thyristor 26 and the other end thereof coupled to the lead 24 between the positive input terminal 12 and the main thyristor 26 by a commutation capacitor 40. The commutator thyristor 38 is poled so as to conduct current in a direction from the commutation capacitor 40 to the commutation inductor 34 when conductive. A charging diode 42 is coupled in parallel with and poled oppositely from the commutator thyristor 38 so as to conduct current in a direction from the commutation inductor 34 to the commutation capacitor 40.

It will be seen that the commutator portion of the chopper 10 includes a single inductive element 34 which is coupled into and forms a part of the free-wheeling path 32. At the same time the inductor 34 is coupled both to the main thyristor 26 and to the commutator thyristor 38 but not to the commutation capacitor 40.

The operation of the circuit of FIG. 1 may be understood in connection with the waveforms of FIGS. 2A–2L by considering an interval which begins when the main thyristor 26 is off, the capacitor 40 is charged to the input voltage $V_I$ as defined by the voltage of the DC source 16 and free-wheeling current due to the inductive filter 28 is flowing through the free-wheeling diode 36 and the commutation inductor 34. With the main thyristor 26 being off, no current flows therethrough as seen in FIG. 2B while the voltage drop thereacross is equal to the input voltage $V_I$ as seen in FIG. 2A. With the commutation capacitor 40 being charged to the voltage of the DC source 16 as shown in FIG. 2I, the side of the capacitor 40 adjacent the main thyristor 26 being positive and the side of the capacitor 40 adjacent the commutator thyristor 38 being negative, no current flows through the commutator thyristor 38 as seen in FIG. 2D and the voltage drop across the thyristor 38 is zero as seen in FIG. 2C. The current through and the voltage drop across the charging diode 42 are likewise of zero value as seen in FIGS. 2F and 2E. The free-wheeling current which is equal to the current $I_L$ through the load 22 flows through the negative output terminal 20, through the free-wheeling diode 36 as seen in FIG. 2H, through the commutation inductor 34 as seen in FIG. 2L, through the positive output terminal 18 and through the inductive filter 28 to the load 22. Accordingly there is no voltage drop across the free-wheeling diode 36 or the commutation inductor 34 as seen in FIGS. 2G and 2K.

At a time $T_1$ shown in FIG. 2, the main thyristor 26 is gated "on" reducing the voltage drop thereacross to zero as seen in FIG. 2A and causing current from the DC source 16 to begin flowing therethrough as seen in FIG. 2B. The high inductance of the inductive filter 28 resists substantial changes in the current flowing therethrough. As a result, the main thyristor 26 attempts to conduct current into the commutation inductor 34 in a direction opposing the free-wheeling current. Since $L(di/dt) = E$, the rate of change of the current through the main thyristor 26 or $di/dt = E/L$, where $E$ is the input voltage $V_I$ and L is the inductance of the commutation inductor 34. Accordingly as seen in FIG. 2B the current through the main thtristor 26 increases generally linearly in controlled fashion as determined by the commutation inductor 34 until load current value $I_L$ is reached and the free-wheeling diode 36 has regained its blocking state at a time $T_2$. During the interval between time $T_1$ and time $T_2$ the current through the main thyristor 26 reduces the free-wheeling current through the diode 36 and the commutation inductor 34 to zero as seen in FIGS. 2H and 2L.

At the time $T_2$ the commutation inductor 34 and the commutation capacitor 40 combine to produce a resonant action which results in a reversal of the voltage across the capacitor 40. With the free-wheeling current reduced to zero, current from the main thyristor 26 begins to flow through the commutation inductor 34 and the charging diode 42 to charge the commutation capacitor 40 in the opposite direction or sense as seen in FIGS. 2L, 2F, and 2I. It will be noted from FIG. 2G that the voltage drop across the free-wheeling diode 36 begins to build up in a sense which insures that the diode 36 will perform its blocking function. At the same time reverse clearing of the free-wheeling diode 36 takes place with a relatively small amount of current from the commutation inductor 34 actually flowing in the reverse direction through the diode 36. Any energy stored in the commutation inductor 34 due to the reverse clearing current through the free-wheeling diode 36 passes through the charging diode 42 to the commutation capacitor 40 where it is smoothly controlled so as to prevent unwanted and sometimes damaging transients of the type which often occur in prior art choppers when the free-wheeling diode clears.

As seen in FIGS. 2B, 2L, 2F and 2J the current through the main thyristor 26, the commutation inductor 34, the charging diode 42 and the commutation capacitor 40 increases to a peak value at a time $T_3$ when the voltages across the capacitor 40 and the inductor 34 reverse as seen in FIGS. 2I and 2K. The current then decreases until it reaches zero value at a time $T_4$ when the commutation capacitor 40 is completely charged in the reverse direction as seen in FIG. 2I. At the time $T_4$ the current through the main thyristor 26 has decreased to the value of the load current $I_L$ as seen in FIG. 2B, and the current through the commutation inductor 34, the charging diode 42 and the commutation capacitor 40 has decreased to zero as seen in FIGS. 2L, 2F, and 2J respectively. Thus at the time $T_4$ the voltage drop across the commutation inductor 34 drops to zero as seen in FIG. 2K, the voltage drop across the freewheeling diode 36 drops to a value equal to the voltage $V_I$ of the DC source 16 as seen in FIG. 2G, and the voltage drops across the commutator thyristor 38 and the parallel coupled charging diode 42 jump from zero to the voltage $V_I$ of the DC source 16 as seen respectively in FIGS. 2C and 2E.

With the commutation capacitor 40 completely charged in the negative direction, current from the capacitor 40 attempts to flow through the charging diode 42 or the commutator thyristor 38 to the commutation inductor 34 so as to attempt to produce a rapid voltage step across the diode 42 and the thyristor 38. Where desired this voltage step can be eliminated by a suppression network (not shown) in the form of the serial combination of a resistor and a capacitor coupled in parallel with the thyristor 38 and the diode 42. As so coupled the resistor and capacitor comprising the suppression network pass the current from the capacitor 40 to the commutation inductor 34 in harmless fashion.

As of the time $T_4$ the chopper 10 is in its opposite state from the state which existed up until the time $T_1$. The chopper 10 may remain in this opposite state with the main thyristor 26 turned on and the commutation capacitor 40 charged in the negative direction until turn off of the main thyristor 26 is desired. Initiation of such turn off is depicted as occurring at a time $T_5$ in FIG. 2.

At the time $T_5$ the commutator thyristor 38 is gated "on" so as to begin conducting current therethrough from the commutation capacitor 40 as seen in FIG. 2D. As in the case when the main thyristor 26 is gated "on" the rate at which current through the commutator thyristor 38 may rise is limited by the commutation inductor 34 to E/L where E is equal to the input voltage $V_I$ from the DC source 16 and L is the inductance of the inductor 34. As seen in FIGS. 2J, 2D and 2L respectively the current through the capacitor 40, the commutator thyristor 38 and the commutation inductor 34 increases linearly and in controlled fashion as determined by the value of the inductor 34 to the load current value $I_L$ at a time $T_6$. During the interval between $T_5$ and $T_6$ the current through the main thyristor 26 decreases to zero as seen in FIG. 2B.

At the time $T_6$ the voltage drop across the main thyristor 26 rapidly increases from zero in a negative sense to a value equal to the input voltage $V_I$ as seen in FIG. 2A. Thereafter the voltage drop across the main thyristor 26 decreases to zero at a time $T_7$ when the voltage of the commutation capacitor 40 has decreased to zero, then increases in a positive sense until it equals the input voltage $V_I$ at a time $T_8$ when the commutation capacitor 40 is substantially completely charged in the positive direction as seen in FIG. 2I. It will therefore be seen that the voltage drop across the main thyristor 26 closely follows the voltage of the capacitor 40 so as to provide a high reverse commutation bias of the main commutating element or thyristor 26. When steady state conditions are reached the commutation capacitor 40 is effectively coupled in parallel with the main thyristor 26 to insure that the thyristor 26 is biased "off." Moreover it will be seen from FIG. 2A that the rate of change of the reapplied voltage drop across the main thyristor 26 is relatively gradual in comparison with many prior art choppers, particularly those having a diode coupled in parallel with the main thyristor.

As previously noted when the voltage of the capacitor 40 decreases to zero at the time $T_7$ the reverse biasing of the main thyristor 26 ceases. Thereafter forward voltage is reapplied to the main thyristor 26 at a rate equal to the load current $I_L$ divided by the capacitance of the capacitor 40. When the capacitor 40 has charged in a positive sense to the input voltage $V_I$ at the time $T_8$ load current $I_L$ begins flowing through the freewheeling diode 36 to the commutation inductor 34 as seen in FIG. 2H rather than via the commutator thyristor 38 which no longer conducts due to the charging of the capacitor 40 as seen in FIG. 2D. It will be seen that this action limits the voltage drop across the capacitor 40 to the input voltage $V_I$. This differs from many prior art chopper circuits in which the commutation capacitor may be subjected to twice the input voltage or even greater values of voltage due to energy "trapped" in the commutation current path. In chopper circuits according to the invention use of a commutation capacitor of relatively low rating or value is possible. Moreover where desired the commutation capacitor may be chosen so as to have a specific voltage rating greater than the input voltage such as twice the input voltage, for example, to provide a safety factor of two.

The particular circuit shown in FIG. 1 comprises but one of the various different circuit configurations which are possible in accordance with the invention. Moreover it should be understood that the circuit of FIG. 1 is presented in simplified form for ease of illustration. In actual practice each of the thyristors 26 and 38 are typically replaced by a plurality of such elements coupled in series to provide a higher voltage capability and coupled in parallel to provide a higher current capability. Also where desired separate charging of the commutation capacitor 40 may be provided so that the main thyristor 26 does not handle the charging impulse in addition to the load component of current.

The chopper circuit shown in FIG. 1 functions effectively for most applications in which it is desired to vary the voltage of the DC source 16 as applied to the load 22. However where the load 22 comprises a DC motor there may be a tendency for reverse current from the motor to flow through the charging diode 42 and discharge the commutation capacitor 40 to a value less than the input voltage $V_I$ due to a substantial difference between the input voltage $V_I$ and the motor voltage. This problem may be prevented by reversing the polarity of both the charging diode 42 and the commutator thyristor 38 and by coupling a resistor between the end of the capacitor 40 opposite the lead 24 and the lead 30. The operation of the resulting circuit is the same as that of FIG. 1 except that the main thyristor 26 is gated "on" very quickly and without any reversal in the charge on the commutation capacitor 40. By the same token when the main thyristor 26 is commutated from "on" to "off" the commutation capacitor 40 experiences a double reversal in the charge thereof producing momentary conduction of the commutator thyristor 38 followed by a short period of conduction by the charging diode 42 and thereafter a flow of free-wheeling current through the diode 36 and the commutation inductor 34 after the main thyristor 26 is commutated "off".

It will be appreciated by those skilled in the art that choppers in accordance with the invention enable the use of relatively simple circuit designs using a minimum number of components with low values or ratings. At the same time such circuits operate in a highly efficient manner so as to provide a wide range of capabilities without dangerous overload or transient conditions. The commutation capacitor itself may be of relatively small value and does not experience overcharge due to load current. The single inductive element which is coupled in the free-wheeling path so as to also be coupled to both controllably conductive devices or thyristors may itself be of relatively low value. Circuits in accordance with the invention provide high reverse commutation bias to the main element while at the same time reapplying a voltage having a relatively low rate of change to such element. For that matter the thyristors experience only input voltage excursions and never have voltage drops thereacross which are greater than the input voltage. Such circuits closely control the rate of current growth both during turn-on of the devices and during clearing thereof. The thyristors are easily gated using relatively simple gating logic. The thyristors may be shunted with protective R-C networks which operate with the commutation reactor to control voltage transients.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a chopper circuit in which a plurality of controllably conductive devices coupled between a DC source and a load are selectively commutated to vary the voltage of the DC source as applied to the load and a current path accommodates free-wheeling current from the load during commutation, the improvement comprising a commutation inductor coupled in the free-wheeling current path, the commutation inductor co-operating with other parts of the chopper circuit to force-commutate at least one of the controllably conductive devices, the chopper circuit including at least two controllably conductive devices coupled to opposite ends of the commutation inductor.

2. The invention defined in claim 1, wherein the chopper circuit includes a commutation capacitor coupled to the at least two controllably conductive devices.

3. In a chopper circuit in which at least a pair of thyristors are coupled between a DC source and a load, the improvement comprising an inductor coupled to both of the thyristors for limiting the rate of current increase in each of the thyristors whenever the thyristor is rendered conductive and a diode coupled to the inductor, the diode and the inductor being coupled to define a path for free-wheeling current from the load.

4. In a chopper circuit in which at least one capacitor is bidirectionally charged to commutate a plurality of controllably conductive devices coupled between a DC source and a load, the improvement comprising an inductor coupled to pass current therethrough in one direction to effect charging of the at least one capacitor and to pass free-wheeling current from the load therethrough in an opposite direction.

5. A circuit for selectively applying signals from a DC source to a load, the DC source and the load each having first and second terminals, comprising a first thyristor coupled between the first terminals of the DC source and the load, a capacitor having one end thereof coupled to the first terminal of the DC source, an inductor having one end thereof coupled to the first terminal of the load, a second thyristor coupled between the end of the capacitor opposite said one end thereof and the end of the inductor opposite said one end thereof, means coupling the second terminals of the DC source and the load to complete a circuit between the DC source and the load and a diode coupled between the means coupling the second terminals and the end of the inductor opposite said one end thereof.

6. The invention defined in claim 5, further including a diode coupled in parallel with the second thyristor.

7. A chopper circuit coupled between and controlling the application of a DC signal from a DC source to a load comprising a plurality of controllably conductive devices, and circuit means coupled across the load to provide a path for free-wheeling current and including inductive means, said inductive means also being coupled to each of the controllably conducted devices to aid in commutation of the controllably conductive devices.

8. The invention defined in claim 7, further including a capacitor coupled in circuit with the controllably conductive devices and the inductive means, said capacitor cooperating with the inductive means to commutate the controllably conductive devices.

9. A chopper circuit coupled between and controlling the application of a DC signal from a DC source to a load comprising the serial combination of an inductor and a diode coupled across the load, and a plurality of thyristors, each of which is coupled to be controlled by the inductor against transient overloads.

10. A chopper circuit coupled between and controlling the application of a DC signal from a DC source to a load comprising a pair of thyristors, a capacitor and an inductor coupled to the thyristors to control commutation thereof, and a free-wheeling current path coupled to the load and including said inductor.

* * * * *